United States Patent [19]

Kobayashi et al.

[11] Patent Number: 4,846,916
[45] Date of Patent: Jul. 11, 1989

[54] METHOD OF MANUFACTURING ELECTRIC CARPET VIA INDUCTION HEATING

[75] Inventors: Hiroshi Kobayashi; Shuji Yamamoto, both of Nara; Osamu Sato, Yamatokoriyama; Kouji Nagahata, Nabari, all of Japan

[73] Assignee: Matsushita Electric Industrial Co., Ltd., Osaka, Japan

[21] Appl. No.: 942,778

[22] Filed: Dec. 17, 1986

[30] Foreign Application Priority Data

Dec. 27, 1985 [JP] Japan ............................ 60-296750
Dec. 27, 1985 [JP] Japan ............................ 60-296751

[51] Int. Cl.$^4$ .................... B32B 31/20; B32B 31/26
[52] U.S. Cl. ...................... 156/274.6; 156/273.9; 156/313; 219/10.53; 219/10.57
[58] Field of Search .............. 156/72, 55, 128, 179, 156/313, 436, 439, 273.9, 274.2, 274.4, 274.6, 304.4, 304.7; 29/825, 829; 219/528, 529, 10.53, 10.57

[56] References Cited

U.S. PATENT DOCUMENTS

| | | | |
|---|---|---|---|
| 2,388,242 | 11/1945 | Arndt | 156/272.4 |
| 3,348,641 | 10/1967 | Gage | 156/273.9 |
| 3,461,014 | 8/1969 | James | 156/272.4 |
| 4,416,713 | 11/1983 | Brooks | 156/304.4 |
| 4,620,085 | 10/1986 | Horikawa | 219/528 |

*Primary Examiner*—Merrell C. Cashion Jr.
*Attorney, Agent, or Firm*—Stevens, Davis, Miller & Mosher

[57] ABSTRACT

The invention provides a method of bonding into an integral structure a unit formed by disposing therein a heating wire and a temperature detecting wire, a surface cloth material of an electric carpet to be manufactured, and an insulating material of the same, wherein a metallic foil is used in the unit, the metallic foil itself is caused to generate heat by electromagnetic induction, at least one heat-fuseable film layer is melted by the generated heat, and the carpet elements are integrally bonded by pressing. The method provides for efficient bonding as well as the elimination of pile-collapsing of the surface cloth material, thus producing electric carpets of high quality.

4 Claims, 3 Drawing Sheets

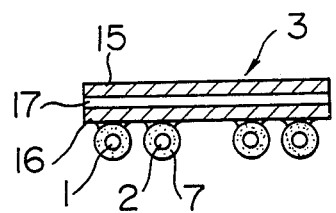
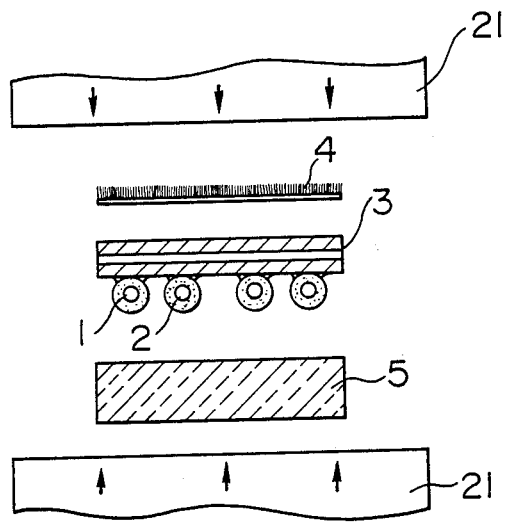

METHOD OF MANUFACTURING ELECTRIC CARPET VIA INDUCTION HEATING

BACKGROUND OF THE INVENTION

1. FIELD OF THE INVENTION

The present invention relates to an art of bonding performed in order to integrate a heat insulating material, a heating unit, and a surface cloth material in electric heaters of the type such as an electric carpet, and provides an effective heating method at the time of bonding by application of heat and pressure (this bonding operation is hereinafter abbreviated to "heat-pressure bonding").

2. DESCRIPTION OF THE PRIOR ART

A conventional method relating to the manufacture of an electric carpet comprises, as shown in FIGS. 7 and 8, wiring on a substrate, not shown, a heating wire 1 and a temperature detecting wire 2, each of which is provided on the outermost side thereof with a heat-fuseable coating layer 7, heat-pressure bonding onto the wires a bonding sheet 3 including a core material 17 having on both surfaces thereof heat-fuseable film layers 15 and 16 so as to integrate the above elements into a unit, interposing the unit between a surface cloth material 4 and a heat insulating material 5 and heat-pressure bonding these elements by means of a hot press so as to integrate these elements.

The above-mentioned hot pressing which has been conducted in the conventional method is a method which comprises interposing an object to be pressed between two hot plates, and melting and bonding the heat-fuseable film layers 15 and 16 by applying heat and pressure from the hot plates.

However, the above method suffers from the following problems. Since the heat-fuseable film layers 15 and 16 are heated by means of the hot plates and through the surface cloth material 4, the heating necessitates a long period for transmission of heat, and the surface cloth material 4 is subjected to a very high temperature which may cause discoloration. In addition, since the elements are pressed while they are at a high temperature in order to ensure positive bonding of the heat-fuseable films 15 and 16 to the surface cloth material 4 and the heat insulating material 5, the pile of the surface cloth material 4 would tend to fall out of its upright posture, spoiling its appearance, and thus causing a problem which is termed a pile-collapsing phenomenon.

SUMMARY OF THE INVENTION

The present invention relates to a bonding process which is applied to the manufacture of an electric heater such as an electric carpet, and an object of the invention is to positively bond component parts of an insulating material, a heating unit, and a surface cloth material in an integral manner while maintaining the physical integrity of the surface cloth material.

Another object of the invention is to shorten the working time as well as to reduce the expense of providing heat energy by enabling an efficient way of heating at the time of heat-pressure bonding.

According to one aspect of the invention, a method of manufacturing an electric carpet is provided which comprises the steps of: wiring a heating wire and a temperature detecting wire on a substrate at predetermined positions, each of the wires being provided on the outermost side thereof with a heat-fuseable coating layer; placing a metallic foil having on at least one surface thereof a heat-fuseable layer on the heating wire and the temperature detecting wire which have thus been wired; bonding the wires and the metallic foil into a unit by applying heat and pressure; causing the metallic foil to generate heat by use of heat generating means while the unit is in the condition of being interposed between a surface cloth and a heat insulating material, and immediately after this pressing the above elements together.

Preferably, the metallic foil of the unit is caused to generate heat from one end thereof, and the portions thereof which generate heat are successively inserted into a pressure roll.

According to another aspect of the invention, a method of manufacturing an electric carpet is provided which comprises the steps of: wiring a heating wire and a temperature detecting wire on a substrate at predetermined positions, each of the wires being provided on the outermost side thereof with a heat-fuseable coating layer; placing a metallic foil having on at least one surface thereof a heat-fuseable layer on the heating wire and the temperature detecting wire which have thus been wired; bonding the wires and the metallic foil into a unit by applying heat and pressure; induction heating the unit from either the upper or lower surface thereof while the unit is in the condition of being interposed between a surface cloth and a heat insulating material in such a manner as to form a layered structure, and immediately after this pressing the above elements together.

Preferably, the unit is induction heated from one end thereof, and the portions thereof which generate heat are successively inserted into a pressure roll.

According to a further aspect of the invention, a method of manufacturing an electric carpet is provided which comprises the steps of: wiring a heating wire and a temperature detecting wire on a substrate at predetermined positions, each of the wires being provided on the outermost side thereof with a heat-fuseable coating layer; placing a metallic foil having on at least one surface thereof a heat-fuseable layer on the heating wire and the temperature detecting wire which have thus been wired; bonding the wires and the metallic foil into a unit by applying heat and pressure; supplying electricity to the metallic foil with the unit interposed between a surface cloth and a heat insulating material in such a manner as to form a layered structure, and immediately after this pressing the above elements together.

Preferably, the metallic foil of the unit is quadrilateral, and power supplying terminals are mounted on two opposite sides of the metallic foil for supplying electricity.

BRIEF DESCRIPTION OF THE DRAWINGS

FIG. 7 is a view showing the structure of a unit of an electric carpet manufactured by a conventional method; and FIG. 8 is a view used in illustrating the conventional method.

DESCRIPTION OF THE PREFERRED EMBODIMENTS

Embodiments of the invention will now be described with reference to the drawings.

Figure 1:
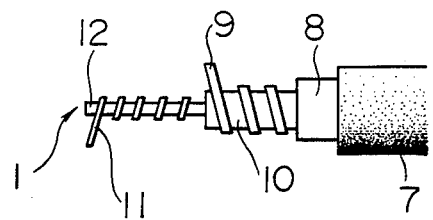
FIG. 1 is a view showing the structure of a heating wire of an electric carpet to be manufactured by a method of the invention.

FIG. 1 shows the structure of a heating wire used in this embodiment. The heating wire comprises a core 12, an inner winding 11 wound spirally around a core thread, an insulating layer 10 formed on the outer periphery of the inner winding 11, an outer winding 9 wound spirally around the layer 10, a jacket 8 formed on the outer periphery of the outer winding 9, and a heat-fuseable coating layer 7 formed on the outer side of the jacket 8. In general, a resin of, for example, the polyethylene resin series is used as the material for the coating layer 7. A temperature detector wire has exactly the same structure as that of the heating wire, with different materials being used for the inner and outer windings, and the resins for the insulating layer having different components.

Figure 2:
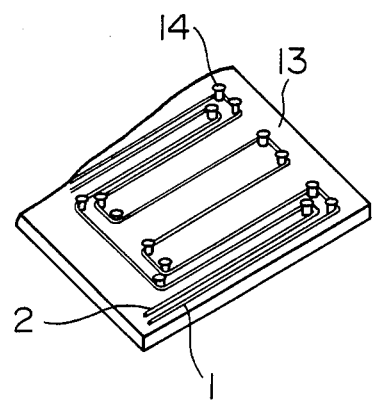
FIG. 2 is a perspective view showing a wiring process being conducted embodying the method of the invention.
Figure 3:
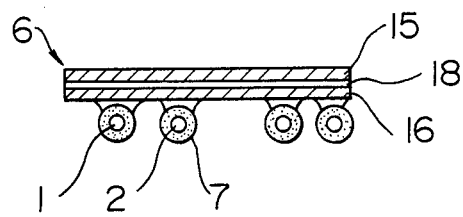
FIG. 3 is a view used in illustrating the method of the invention, which shows the structure of a unit of the carpet.

Subsequently, as shown in FIG. 2, the heating wire 1 and the temperature detecting wire 2 are wired on a substrate 13. Sliding pins 14 are used for determining the wiring positions. Since a metallic foil 18, described below, has on at lesat one surface thereof a heat-fuseable film layer and, therefore, may have on both of its surfaces heat-fuseable film layers 15 and 16, as shown in FIG. 3, these pins are disposed to be movable in the upward or downward direction through a spring member, not shown, so that they do not represent any obstacle when heat-pressure bonding the metallic foil 18. After the wires have thus been wired, a metallic foil 18 having on both surfaces thereof heat-fuseable film layers 15 and 16 is placed on the wires. Alternatively, a metallic foil 18 having one heat-fuseable coating layer on one side may be used. When the wires and the foil are heated and pressed from above the film for a predetermined period of time, the heat-fuseable coating layers 7 and the heat-fuseable film layer 15 of the metallic foil 18 are fusion bonded and unified. When the thus unified structure is removed from the substrate 13, a unit 6 is completed.

Figure 4:
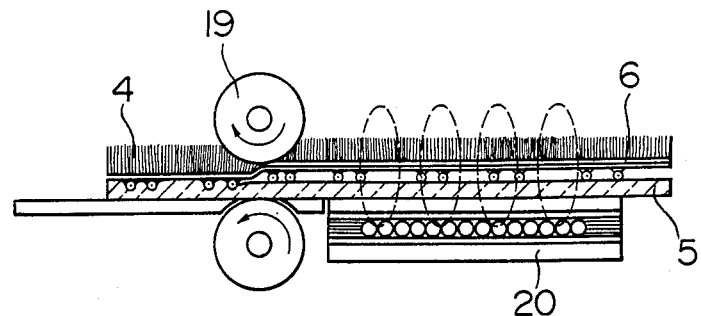
FIG. 4 is a view used in illustrating a first embodiment of the invention.
Figure 5:
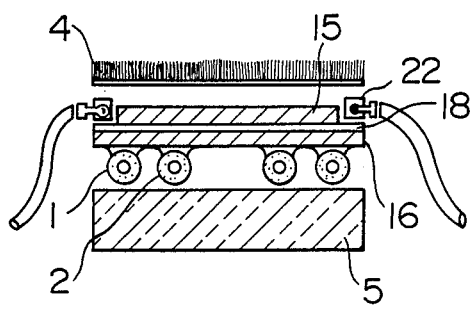
FIGS. 5 and 6 are views used in illustrating a second embodiment of the invention.
Figure 6:
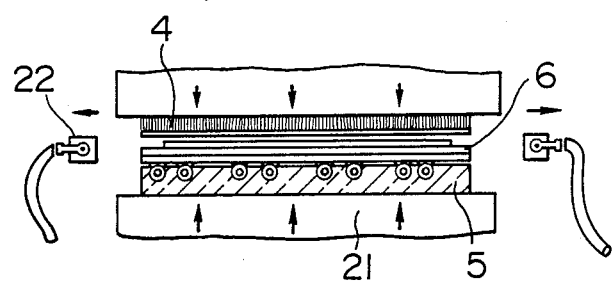

The unit 6 is then interposed between a surface cloth material 4 and a heat insulating material 5, which are constituents of an electric carpet to be manufactured, in such a manner as to form a layered structure. When this layered structure is passed over an induction heating device 20 at a suitable speed, as shown in FIG. 4, the metallic foil 18 of the unit 6 (shown in FIG. 3) which has the heat-fuseable film layers generates heat whereby the heat-fuseable film layers 15 and 16 on both surfaces of the metallic foil 18, as well as the heat-fuseable coating layers 7 of the heating wire 1 and the temperature detecting wire 2, are melted, thus fusion bonding the surface cloth material 4 and the heat insulating material 5 to the unit 6; these elements are integrated by means of a pressure roll 19 provided immediately after the heating device.

As will be clear from the above description, because the metallic foil 18 which is adjacent to the heat-fuseable film layer 15 and to the heat-fuseable coating layers 7 is caused to generate heat, the transmission of heat need not be lengthy and the surface cloth material 4 is not subjected to a very high temperature, thereby preventing discoloration and pile-collapse of the surface cloth material 4.

In addition, because portions of the layered structure are successively inserted into the pressure roll 19 after those portions were passed over the induction heating device 20, a large electric carpet can be manufactured without needing to make the induction heating device large.

Although the bonding is performed by pressing with a roll, this feature is not limitative; alternatively, a press (which in this case may be at a relatively low temperature) may also be used. Even in the latter case, no discoloration or pile-collapse of the surface cloth material 4 will take place, and a lengthy period of time will not be required for the work.

As described above, the following remarkable advantages are provided in accordance with the present invention.

In order to fix the structure of an electric carpet to be manufactured, because the method in accordance with the invention adopts direct and internal heating wherein a metallic foil having at least one heat-fuseable film layer is interposed between a surface cloth material of the carpet and a heat insulating material of the same, and because the metallic foil is heated by induction heating, discoloration and pile-collapsing phenomenon due to heating of the surface cloth material are eliminated, thereby ensuring that the surface cloth material retains a good texture and is free from the pile-collapsing problem due to heating suffered by the prior art.

Further, the internal heating is efficiently performed, thus allowing reduction in the number of process steps and in the expense of equipment operation. Further, because the work is done at a temperature lower than that in the prior art, the heating wire and the temperature detecting wire are freed from the risk of heat shrinkage, thus allowing a better result when finished. Additionally, the materials to be used are not subject to as many limitations with respect to heat.

What is claimed is:

1. A method of manufacturing an electric carpet comprising the steps of:
   placing a heating wire and a temperature detecting wire onto a substrate, each of said wires being provided on the outermost side thereof with a heat-fuseable coating layer;
   placing a metallic foil having on at least one surface thereof a heat-fuseable layer on said heating wire and said temperature detecting wire;
   bonding said wires and said metallic foil into a unit by applying heat and pressure;
   placing said unit between a surface cloth and a heat insulating material, forming a layered structure;
   placing said layered structure in an induction heating device;
   heating said layered structure from above, while moving said layered structure relative to said induction heating device; and,
   immediately after said induction heating pressing the elements of said layered structure together.

2. A method of manufacturing an electric carpet as claimed in claim 1, wherein said layered structure having passed said induction heating device is inserted from the exit side of said induction heating device successively into a pressure roll means.

3. A method of manufacturing an electric carpet comprising the steps of:

placing a heating wire and a temperature detecting wire onto a substrate, each of said wires being provided on the outermost side thereof with a heat-fusible coating layer;

placing a metallic foil having on at least one surface thereof a heat-fusible layer on said heating wire and said temperature detecting wire;

bonding said wires and said metallic foil into a unit by applying heat and pressure;

placing said unit between a surface cloth and a heat insulating material, forming a layered structure;

placing said layered structure in an induction heating device;

heating said layered structure from below, while moving said layered structure relative to said induction heating device; and, immediately after said induction heating pressing the elements of said layered structure together.

4. A method of manufacturing an electric carpet as claimed in claim 3, wherein said layered structure having passed said induction heating device is inserted from the exit side of said induction heating device successively into a pressure roll means.

* * * * *